US012429197B2

(12) United States Patent
Cacciabeve

(10) Patent No.: US 12,429,197 B2
(45) Date of Patent: Sep. 30, 2025

(54) HEAD LIGHT

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

( * ) Notice: Subject to any disclaimer, the term of this patent is extended or adjusted under 35 U.S.C. 154(b) by 0 days.

(21) Appl. No.: 18/902,070

(22) Filed: Sep. 30, 2024

(65) Prior Publication Data

US 2025/0277577 A1 Sep. 4, 2025

Related U.S. Application Data

(63) Continuation-in-part of application No. 29/930,951, filed on Mar. 4, 2024.

(60) Provisional application No. 63/561,143, filed on Mar. 4, 2024.

(51) Int. Cl.

| | |
|---|---|
| ***F21V 21/084*** | (2006.01) |
| ***F21L 4/02*** | (2006.01) |
| ***F21L 4/08*** | (2006.01) |
| ***F21V 21/14*** | (2006.01) |
| ***F21V 23/04*** | (2006.01) |
| ***F21V 23/06*** | (2006.01) |
| *F21Y 115/10* | (2016.01) |

(52) U.S. Cl.
CPC .............. *F21V 21/084* (2013.01); *F21L 4/02* (2013.01); *F21L 4/08* (2013.01); *F21V 21/145* (2013.01); *F21V 23/0428* (2013.01); *F21V 23/06* (2013.01); *F21Y 2115/10* (2016.08)

(58) Field of Classification Search
CPC .. F21V 21/084; F21V 21/145; F21V 23/0428; F21V 23/06; F21L 4/02; F21L 4/08; F21Y 2115/10
See application file for complete search history.

(56) References Cited

U.S. PATENT DOCUMENTS

| | | | | |
|---|---|---|---|---|
| 5,412,811 A * | 5/1995 | Hildenbrand | .......... | A61B 90/50 2/418 |
| 10,907,776 B1 * | 2/2021 | Haddad | .................. | F21V 21/32 |
| 2007/0013864 A1 * | 1/2007 | Dietz | ..................... | G02C 11/00 351/155 |
| 2015/0198313 A1 * | 7/2015 | Rementer | ........... | F21V 23/0414 362/105 |
| 2020/0109847 A1 * | 4/2020 | Poggio | ...................... | F21L 4/04 |
| 2021/0311322 A1 * | 10/2021 | Belanger | ................... | F21L 4/02 |
| 2022/0099281 A1 * | 3/2022 | Cacciabeve | ............... | F21L 4/02 |
| 2023/0031613 A1 * | 2/2023 | Fleury | .................. | A61B 5/6803 |

* cited by examiner

*Primary Examiner* — Evan P Dzierzynski
(74) *Attorney, Agent, or Firm* — Breiner & Breiner, L.L.C.

(57) ABSTRACT

A head light for wearing on a user's head having a head member adapted to fit on a user's head, the head member includes a battery on each side of the head member and ear cushion member on each side of the head member, body members having a light source on each side of the head member, each body member is attached to the head member and moves on an up and down axis in relation to the head member, a power source located in the battery housing of the head member, and an on/off switch on each body member.

12 Claims, 8 Drawing Sheets

FIG. 1
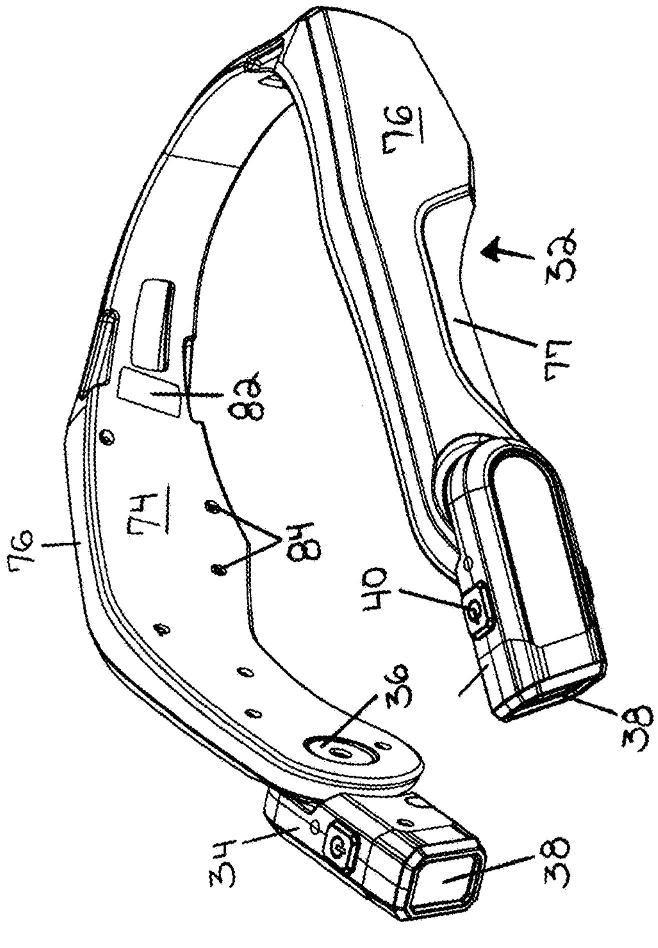
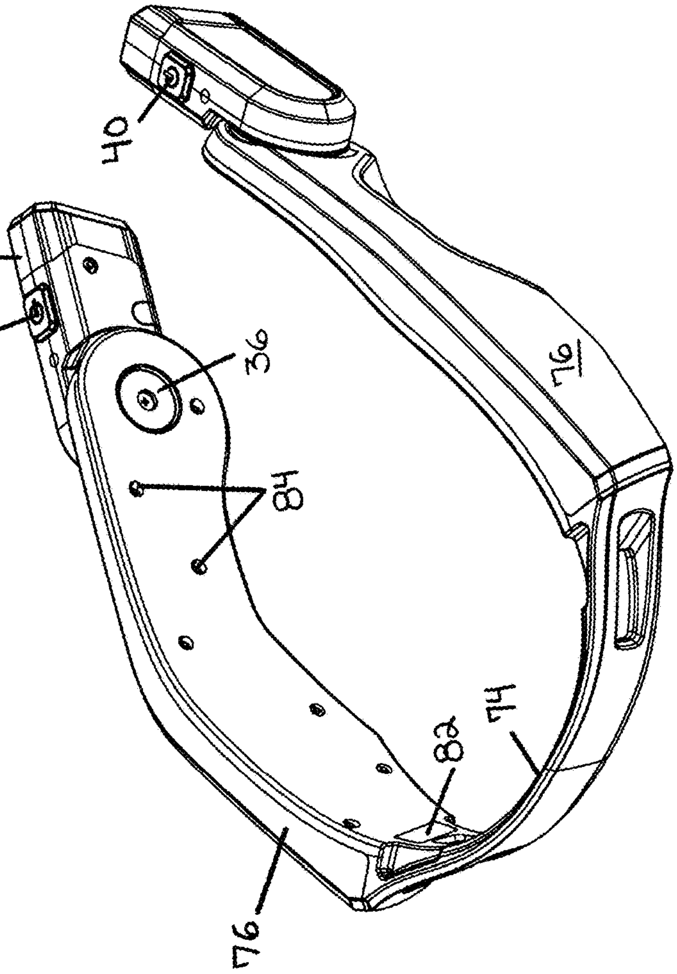
FIG. 2

HEAD LIGHT

RELATED APPLICATION

This application claims benefit of U.S. Provisional Application Ser. No. 63/561,143, filed Mar. 4, 2024, entitled "Head Light," and is a continuation-in-part of U.S. application Ser. No. 29/930,951, filed Mar. 4, 2024, entitled "Head Light," which applications are incorporated herein by reference in their entirety.

FIELD OF THE INVENTION

The present invention relates to a portable light. More particularly, the invention relates to a portable head light.

BACKGROUND OF THE INVENTION

Portable lights are known for use in various situations, including working on an automobile, working in the home and recreational uses. In such instances, there may not be an adequate amount of light; the user may require hands free lighting; the user may need to focus the light on the specific area being worked on; or similar issues.

A very successful portable light on the market is the E-Z Red Company ANYWEAR® portable light and the portable lights disclosed in E-Z Red Company's U.S. Pat. Nos. 10,677,431; 10,900,647; 11,215,344; 11,333,335; 11,703,212; D871,257; D871,636; D978,396; and D981,613, which patent disclosures are incorporated herein by reference. The portable lights are hands free and directs light to the environment of use.

As seen, portable lights are known in the art. While these devices, such as the E-Z Red portable lights, provide a number of the desired attributes, including as set forth above, there is always room for improvement. This application is directed to an improved portable light to be worn on the head, a head light.

SUMMARY OF THE INVENTION

An object of the invention is to provide a portable light which may be worn on a user's head.

Another object of the invention is to provide a portable light which is wearable on a user's head and provides hands free lighting for work, recreation or other activities.

Another object of the invention is to provide a portable light which fits on a user's head, resting comfortably on the user's ears.

Another object of the invention is to provide a portable head light having two light sources, one on each side of the head, preferably operable independent of each other.

Another object of the invention is to provide a portable head light having two light sources, one on each side of the head, preferably operable independent of each other, wherein the lights project light close to the user's line of sight to illuminate the area the user is looking at.

Another object of the invention is to provide a portable head light having a head member which rests comfortably on a user's ears and which includes ear members made of an overmolded thermoplastic polymer rubber (TPR) which cushions the head member on the user's ears, thereby making the head light comfortable, including over extended periods of use.

Another object of the invention is to provide a portable head light having an LED light source on each side of the user's head and providing up to 300 lumens per light source.

Another object of the invention is to provide a portable light wearable on a user's head with a light source on each side which may be independently adjustable on an up and down axis to direct illumination of light as required by the user.

Another object of the invention is to provide a portable light powered by batteries, including rechargeable batteries, preferably located in a head member.

Another object of the invention is to provide a portable light wearable on a user's head made of a semirigid plastic such as ABS (acrylonitrile butadiene styrene) plastic. The head member of the portable light may be flexible allowing the portable head light to be pulled outward when placing the light around a user's head and once on a user's head to rest on the user's ears.

Another object of the invention is to provide a portable head light having a rechargeable battery, a USB port and a battery charge indicator, preferably for each light.

The portable head light of the invention comprises a head member adapted to fit on a user's head and rest on a user's ears, body members having a light source on each side of the head member, each body member is attached to the head member and moves on an up and down axis in relation to the head member, a power source located in the head member and an on/off switch on each body member.

These and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 1 is a front and side perspective view of the head light of the invention.

FIG. 2 is a back and side perspective view of the head light of FIG. 1.

DETAILED DESCRIPTION OF THE PREFERRED EMBODIMENTS

Figure 21:
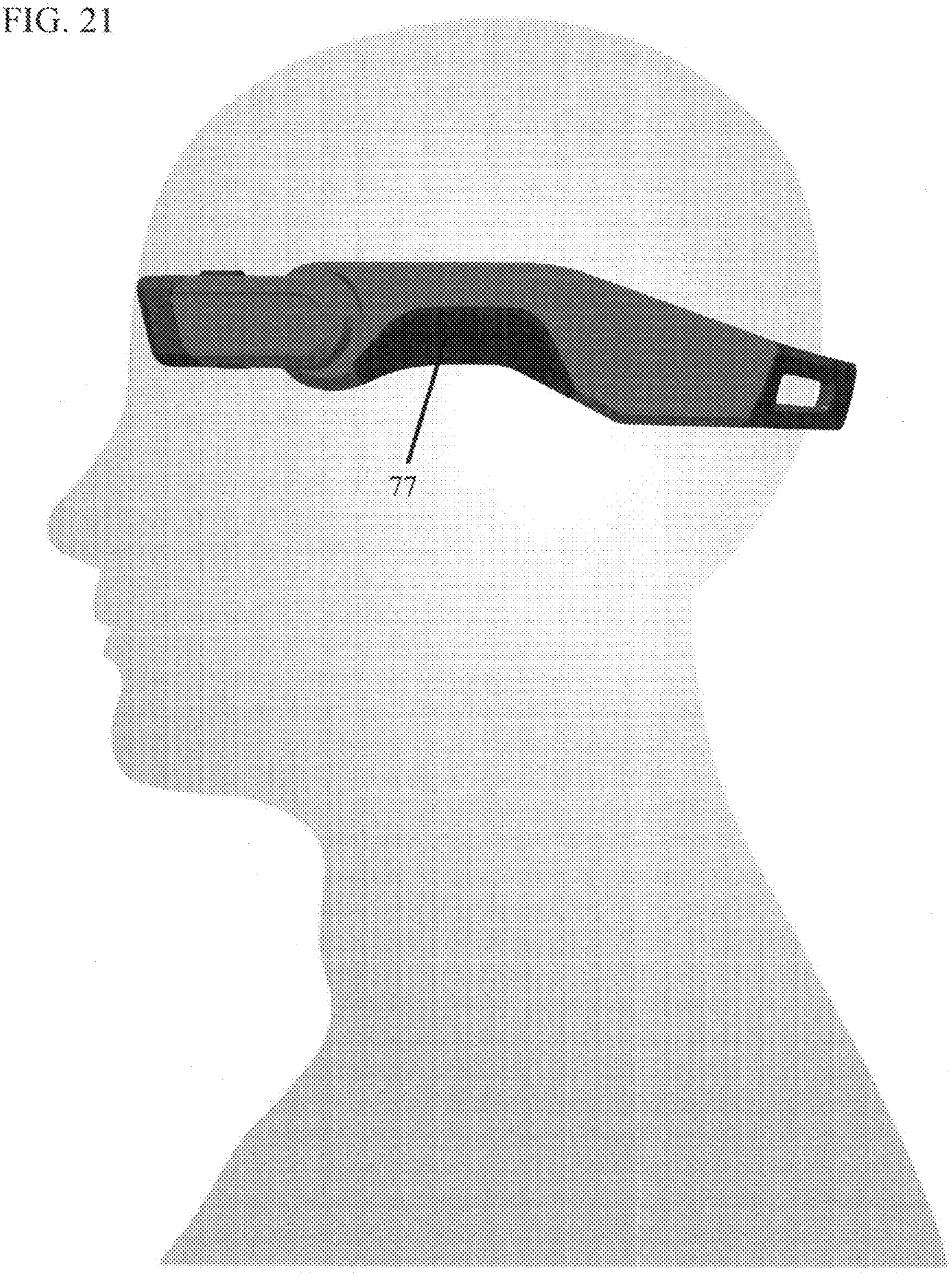
FIG. 21 illustrates the light of FIG. 1 worn on a user.

The present invention is directed to a head light which is worn on the head of a user as shown in FIG. 21. The head light includes on each side thereof a light source to provide the necessary illumination to an area of interest such as in an automotive garage or a work area in the home or for recreational purposes such as camping. The portable light of the present invention includes a head member adapted to fit on a user's head, body members having a light source on each side of the head member, each body member is attached to the head member and moves on an up and down axis in relation to the head member, a power source located in the head member and an on/off switch on each body member.

Referring, for example, to FIGS. 1 and 2, there is shown a head light 30. The head light 30 includes a head member 32, body members 34, moveable members 36, light sources 38 and switches 40. The head light 30 will now be discussed in further detail.

Figure 3:
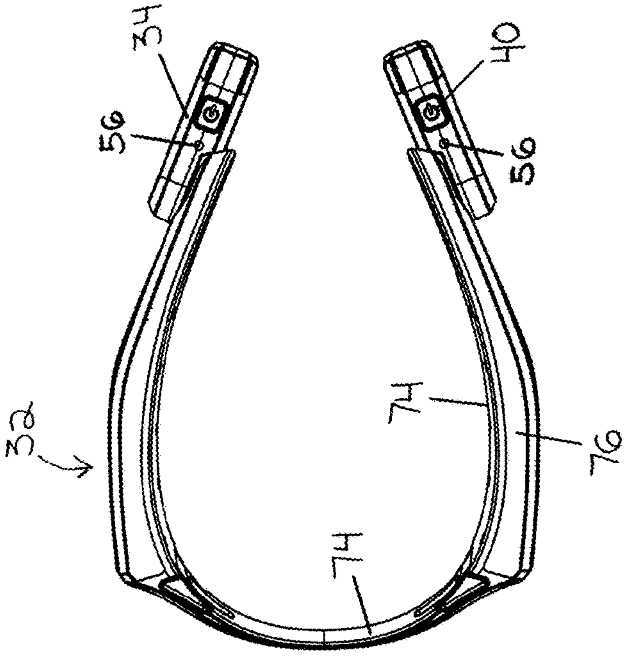
FIG. 3 is a top view of the head light of FIG. 1.
Figure 4:
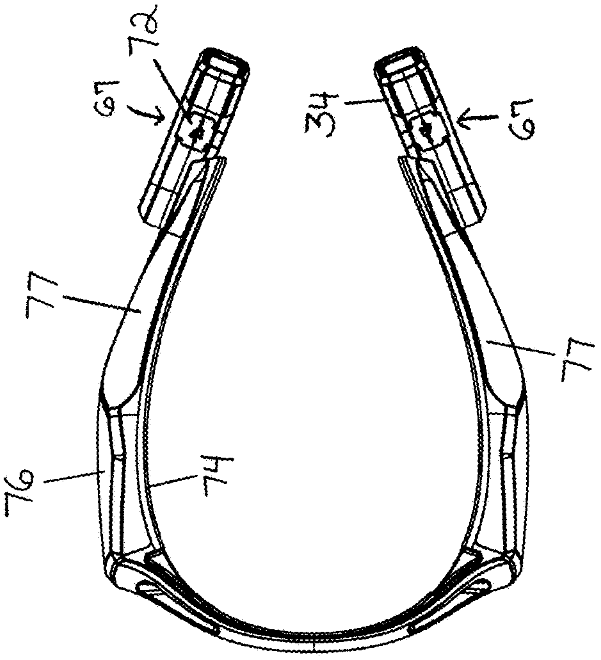
FIG. 4 is a bottom view of the head light of FIG. 1.
Figure 6:
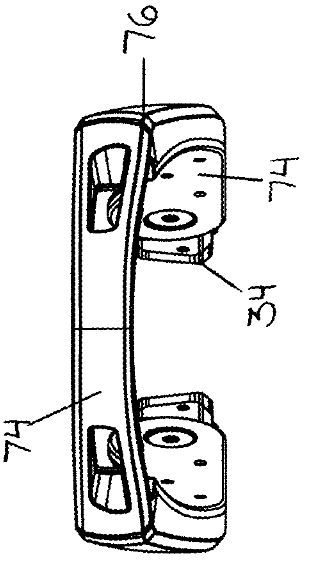
FIG. 6 is a back view of the head light of FIG. 1.
Figure 5:
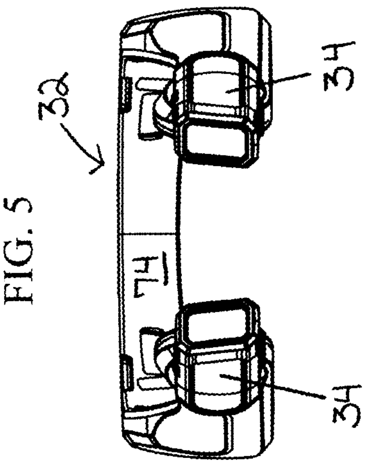
FIG. 5 is a front view of the head light of FIG. 1.
Figure 7:
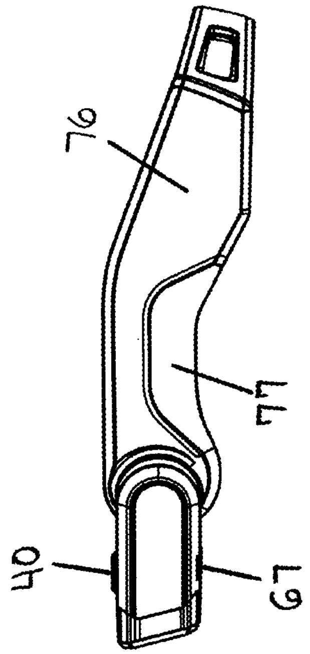
FIG. 7 is a side view of the head light of FIG. 1.
Figure 8:
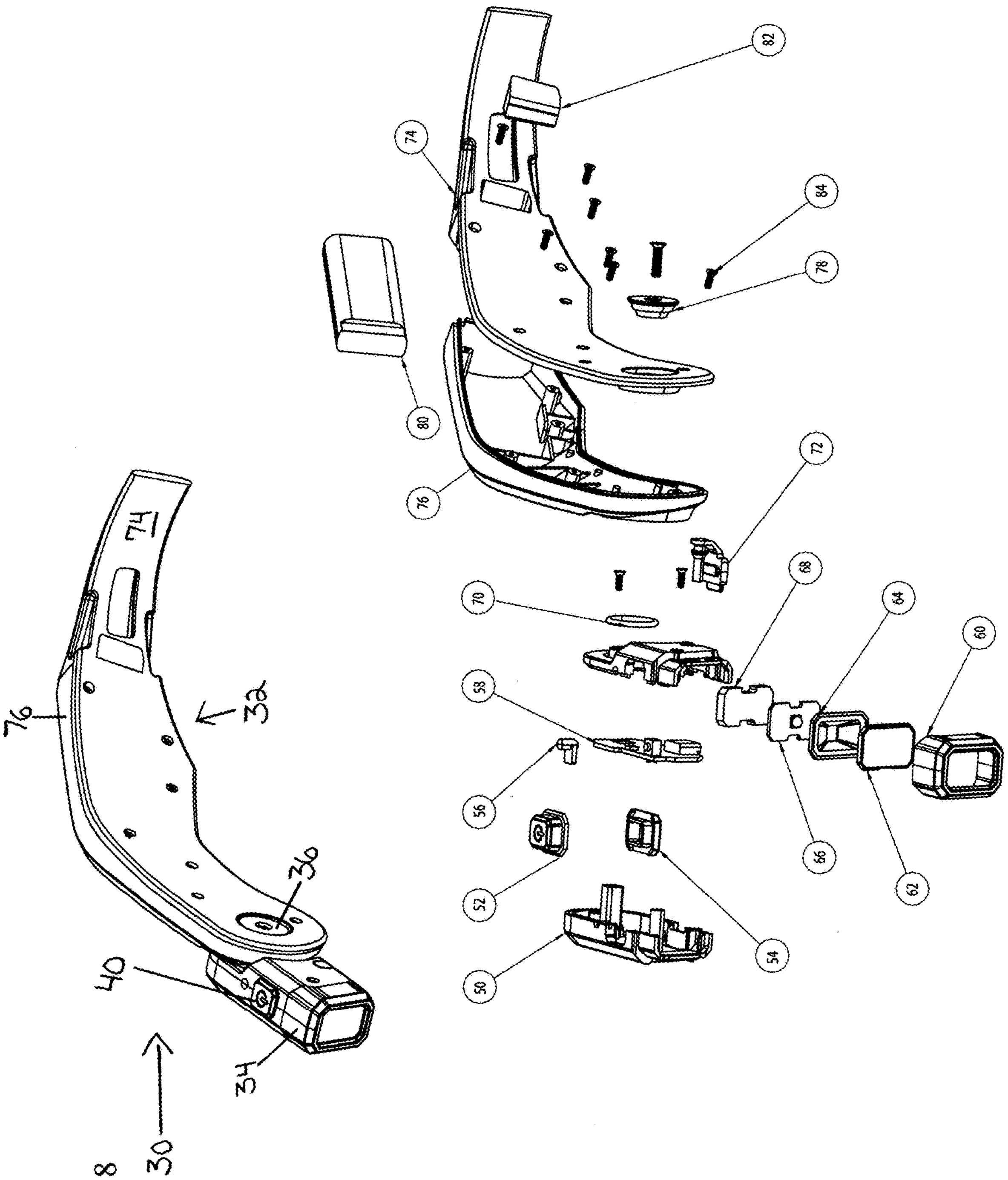
FIG. 8 is an exploded view of one-side of the head light of FIG. 1, the opposite side being substantially the same.
Figure 12:
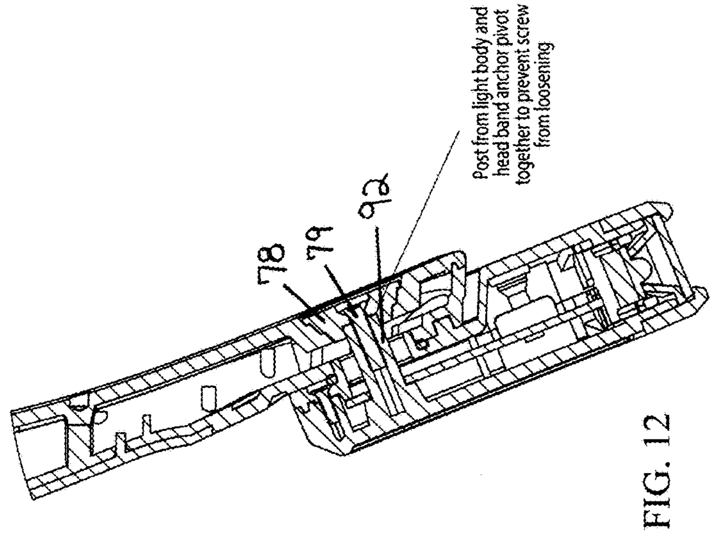
FIG. 12 is a cross-sectional view taken along line 12-12 of FIG. 11.
Figure 11:
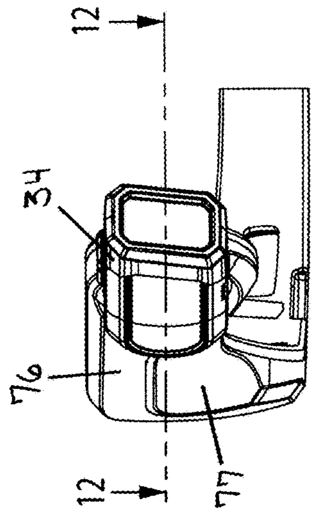
FIG. 11 is a partial front and side view of the light of FIG. 9.
Figure 10:
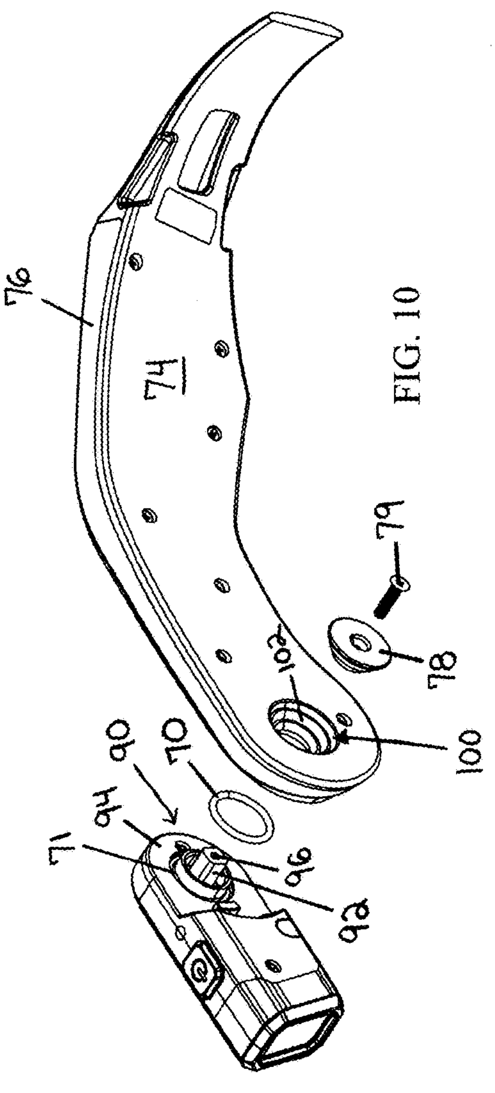
FIG. 10 is a partial exploded view of the head light of FIG. 9.
Figure 9:
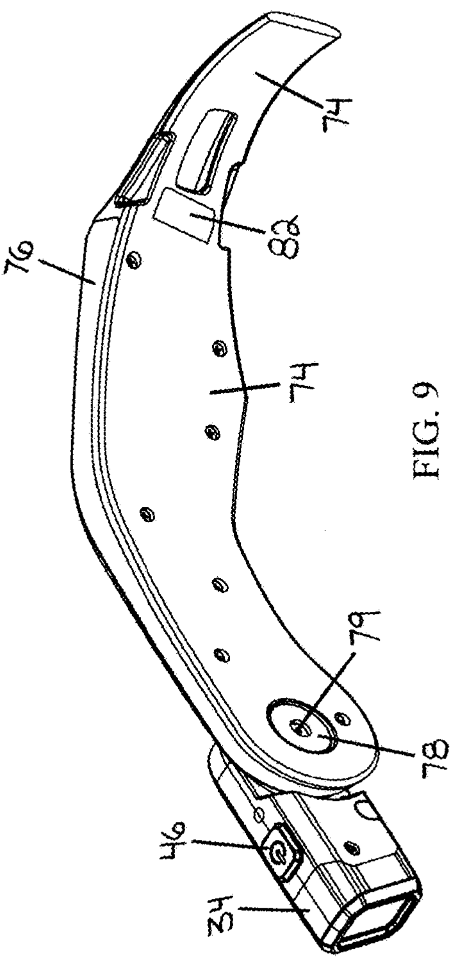
FIG. 9 is a partial side view of the head light of FIG. 1 showing the inside portion of the light.
Figure 17:
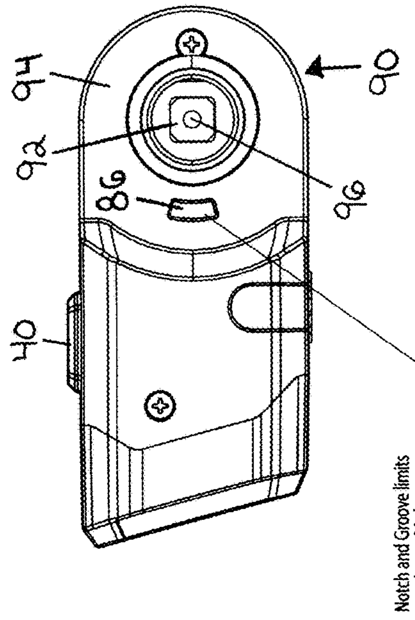
FIG. 17 is a close-up view of the body member showing the notch which rotates in a groove of the head member.
Figure 16:
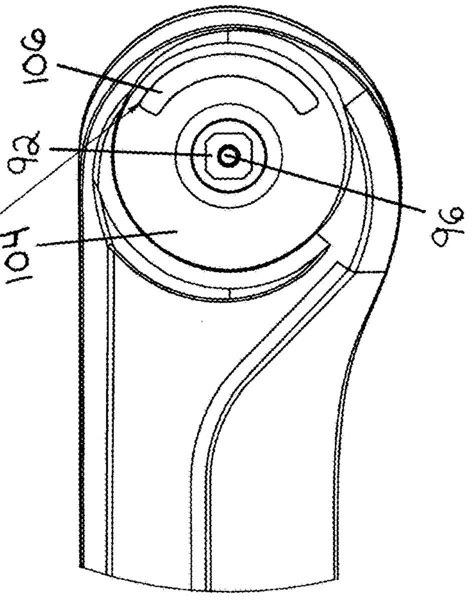
FIG. 16 is a close-up of section 16 in FIG. 15.
Figure 13:
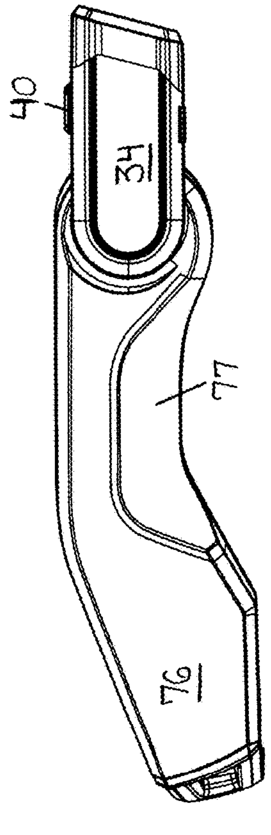
FIG. 13 is a partial side view of the light of FIG. 1 showing the outside portion of the light.

Referring to FIG. 8, there is shown an exploded view of one side of the head light 30 and includes components of the head light 30 as follows:

50 Body Member Housing (2 pieces)
52 Switch Button
54 Switch Button Retainer
56 Charge Indicator Lens
58 PCB
60 Front Cap
62 Lens
64 Reflector
66 LED Board
68 Aluminum Heat Sink
70 Gasket
72 Charge Port Cover
74 Head Band
76 Battery Housing
78 Head Band Anchor
80 Rechargeable Battery
82 Head Band Silicone Insert
84 Hardware The opposite side of the head light is substantially the same.

The various components of the portable head light 30 will now be discussed in further detail. Head member 32 fits on a user's head and rests on the ears of the user as shown in FIG. 21. The head member 32 may be flexible allowing the head light to be pulled outward when placing the light on a user's head and may contract once on a user's head and rest snuggly around the head and lay on the user's ears. Each body member 34 may include an on/off switch 40 and the lighting components to independently turn off each light source as shown in FIG. 8 and discussed below.

The body member 34 is a molded ABS plastic and includes a body housing 50. The body 34 is connected to head member 32 to provide rotational movement of the body member 34 on head member 32 to adjust the position of the body member and to focus the light as discussed hereafter. Referring to FIG. 8, Body member 34 further includes a button 52 and button retainer 54 for on/off switch 40, a front cap 60, a lens 62, a reflector 64, and LED board 66 for light source 38, a charging port 67 having a charge indicator light lens 56 and a charging port cover 72, and a PCB 58 for controlling the head light functions. The switch 40 and operating components may provide for two or more operating modes, e.g. on/off; or with high and low illumination and off; or on with multiple degrees of illumination and off. In a presently preferred embodiment, the body member is about 2.5 inches in length, 1.0 inch in height and 0.75 inches in width. This size allows for easy adjustment of the body member.

The head member 32 includes a head band 74 which fits around a user's head and is preferably made of ABS. Attached to the head band on each side are a battery housing 76 attached to the head band by fasteners 84. The battery housing 76 includes ear members 77 which include an overmolded TPR for a comfortable fit on the user's ears. A rechargeable battery 80 is in battery housing 76 and connected by electric wires to the lighting components in body member 34. It is understood that a non-rechargeable battery may also be used without departing from the scope of the invention. There is a silicone insert 82 on the head band 74 to cover an opening in the head band and the inside of the battery housing.

Referring, for example, to FIGS. 8-10 and 12, the head member 32 is connected to body 34 by head band anchor 78 and a fastener 79. There is a gasket 70 in groove 71 of the body member and which seats on a corresponding outside wall of the head member.

Figure 14:
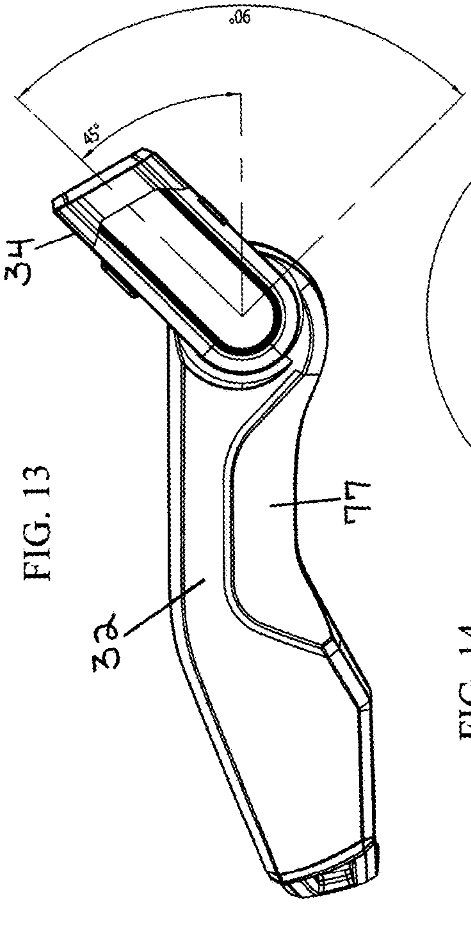
FIG. 14 is a view of the head light of FIG. 13 showing the rotational movement of a body member of the light.
Figure 15:
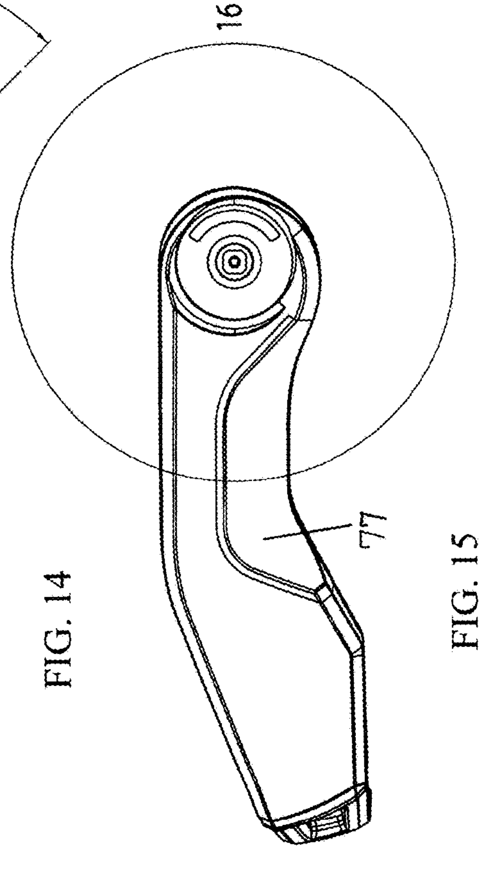
FIG. 15 is a view of FIG. 13 without the body member and in partial cross-section showing part of the structure for controlling the rotational movement of the body member.

Referring to FIGS. 9-16, there is shown the structure for providing the rotation of body member 34 on head member 32. The body member 34 includes an end 90 having a post 92 extending outward from an inside side wall 94 of the body member. Post 92 includes an aperture 96 for receiving fastener 79. The post 92 and anchor 76 pivot together with movement of the anchor when rotating the body member which prevents the screw 79 from loosening. As seen above, there is a gasket 70, preferably of a soft and resilient rubber, which provides friction in the up and down movement of the body member on the head member. There is a notch 86 on inside wall 94. The head member 32 includes an opening 100 having a tapered wall 102 with ridges for receiving anchor 78 with protrusions corresponding to the ridges allowing movement of the anchor when moving the body member which fits in opening 100. The anchor 78 fits into the post 92. The inside wall 104 of head member 32 includes a groove 106 which mates with notch 86 to control the up and down movement of body member 34 on head member 32. This structure allows up and down movement of body member 34 on head member 32 for the user to focus the light source. The body member 34 may rotate in a 90 degree motion as shown in FIG. 14.

Figure 20:
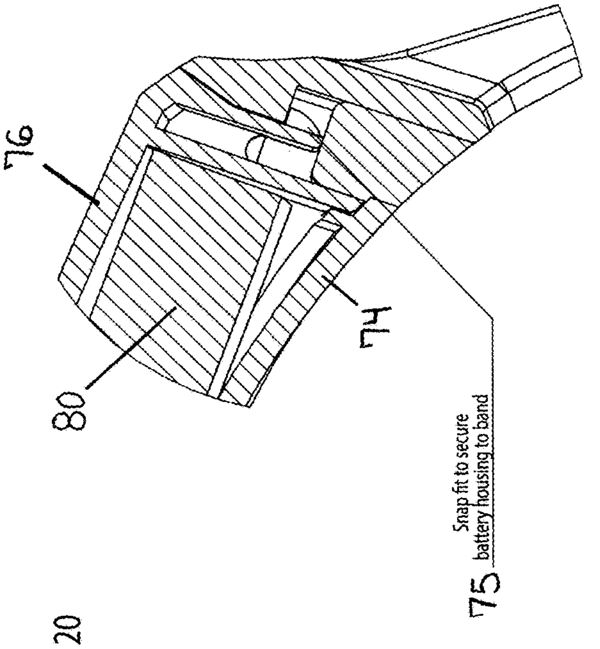
FIG. 20 is a close-up view of section 20 of FIG. 19.
Figure 19:
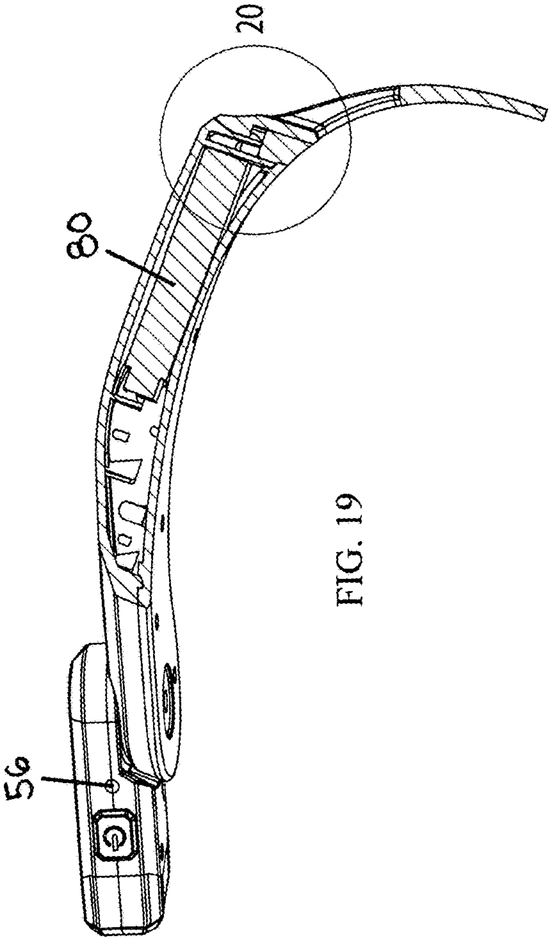
FIG. 19 a partial cross-sectional view taken along line 19-19 of FIG. 18.
Figure 18:
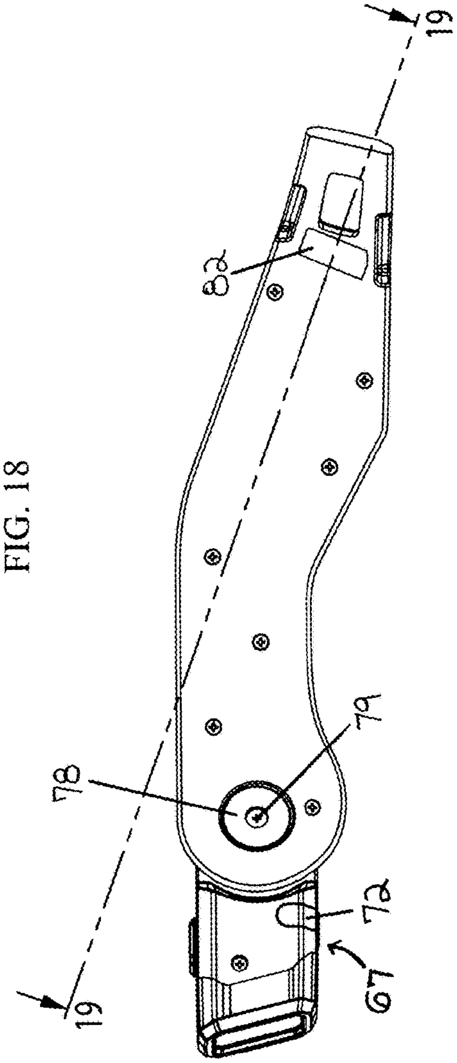
FIG. 18 is a partial side view of the light of FIG. 1 showing the inside portion of the light.

Referring to FIGS. 8 and 18-20, the head light 30 includes a rechargeable battery 80 and an USB port 67 for recharging the battery. There is a USB port cover 72 covering the USB port 67 and a charge indicator light and lens 56. The portable light may be charged using a USB-Y cord so that the user may charge both batteries at the same time. As seen in FIG. 20, besides hardware 84, the head band 74 and battery housing 76 are further held together by snap fit member 75.

In use, a user places the head light 30 on the user's head and turns on the light source at one or both sides of the user's head by switches 40. The user may adjust each of the body members 34 with the light sources 38 up and down. Preferably, the head light is constructed and arranged to provide for about a 90 degree angle of rotation of body members 34 as shown in FIG. 14.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A head light for wearing on a person's head comprising a head member adapted to fit on the person's head and having a first end and second end, the head member having a first battery housing on one side of the head member and a second battery housing on the opposite side of the head member, each of said first and second battery housings having a battery therein, the head member is constructed and arranged to include first and second ear members on each side of the head member adapted to rest on the person's ears and located between one of the respective first and second ends and one of the respective first and second battery housings, wherein the ear members are inwardly recessed from an outer surface of the head member, a first body member having a first light source attached at the first end of the head member and adapted to move up and down on the head member, a second body member having a second light source attached at the second end of the head member and adapted to move up and down on the head member, and a switch on each of the first and second body members adapted to turn the first and second light sources on and off.

2. The head light of claim 1 wherein the first and second body members are adapted to be moved to a plurality of positions, including 90 degree movement.

3. The head light of claim 2 wherein the first and second body members include a notch on the inside wall of the body member and each of the first and second ends of the head member include a groove in the outside wall of the head member, wherein the notch is adapted to fit into the groove.

4. The head light of claim 3 further comprising an anchor adapted to fit into an opening at each of the first and second ends of the head member and each of the first and second body members include a post adapted to engage the anchor.

5. The head light of claim 1 wherein said light sources comprise LED light sources.

6. The head light of claim 1 wherein said battery comprises a rechargeable battery.

7. The head light of claim 6 wherein the first and second body members includes a USB port for recharging the rechargeable battery.

8. The head light of claim 7 wherein the first and second body members further include a power level indicator.

9. The head light of claim 8 further comprising a USB-Y cord for recharging said rechargeable batteries.

10. The head light of claim 1 wherein the head member further includes a head band.

11. The head light of claim 1 wherein the first and second ear members include a cushioning member.

12. The head light of claim 11 wherein the ear cushioning members are made of a thermoplastic polymer rubber.

* * * * *